US012367840B2

(12) United States Patent
Nagato et al.

(10) Patent No.: US 12,367,840 B2
(45) Date of Patent: Jul. 22, 2025

(54) DISPLAY APPARATUS

(71) Applicant: Sharp Display Technology Corporation, Kameyama (JP)

(72) Inventors: Atsunori Nagato, Kameyama (JP); Takashi Sasaki, Kameyama (JP)

(73) Assignee: Sharp Display Technology Corporation, Mie (JP)

( * ) Notice: Subject to any disclaimer, the term of this patent is extended or adjusted under 35 U.S.C. 154(b) by 0 days.

(21) Appl. No.: 18/891,272

(22) Filed: Sep. 20, 2024

(65) Prior Publication Data

US 2025/0124882 A1 Apr. 17, 2025

(30) Foreign Application Priority Data

Oct. 13, 2023 (JP) ................................ 2023-177208

(51) Int. Cl.
*G09G 3/36* (2006.01)
*G09G 3/34* (2006.01)

(52) U.S. Cl.
CPC ......... *G09G 3/3406* (2013.01); *G09G 3/3648* (2013.01); *G09G 2310/08* (2013.01); *G09G 2320/0247* (2013.01); *G09G 2320/064* (2013.01); *G09G 2360/16* (2013.01)

(58) Field of Classification Search
CPC ............... G09G 3/3406; G09G 3/3648; G09G 2310/08; G09G 2320/0247; G09G 2320/064; G09G 2360/16
See application file for complete search history.

(56) References Cited

U.S. PATENT DOCUMENTS 6,900,820 B2 * 5/2005 Kataoka ............... G09G 3/3648 315/86
12,142,187 B2 * 11/2024 Kim ......................... G09G 3/36
12,183,235 B2 * 12/2024 Wen ..................... G09G 3/2003
12,236,903 B2 * 2/2025 Wu ...................... G09G 3/3406
2014/0267370 A1 * 9/2014 Albrecht ................ G09G 5/006 345/602
2022/0059028 A1 * 2/2022 Ito ........................ G09G 3/3208
2022/0328015 A1 * 10/2022 Sun ...................... G09G 3/3406
2024/0386834 A1 * 11/2024 Yang ......................... G09G 5/10
2025/0087126 A1 * 3/2025 Wen ......................... G09G 3/20

FOREIGN PATENT DOCUMENTS

JP 2013-156326 A 8/2013
JP 2013-205574 A 10/2013

* cited by examiner

*Primary Examiner* — Gene W Lee
(74) *Attorney, Agent, or Firm* — ScienBiziP, P.C.

(57) ABSTRACT

A display apparatus includes a display panel that includes a liquid-crystal panel and a backlight arranged behind the liquid-crystal panel, and a controller that controls a luminance of the backlight and a transmittance ratio of the liquid-crystal panel. The controller is configured to: when a refresh rate at which an image is displayed on the display panel is switched, vary the luminance of the backlight such that a variation of a luminance of the display panel between before and after switching of the refresh rate falls within a predetermined range; vary the transmittance ratio of the liquid-crystal panel such that the variation of the luminance of the display panel falls within the predetermined range within a time duration that lasts until the luminance of the backlight reaches a target value; and restore the original transmittance ratio of the liquid-crystal panel after elapse of the time duration.

3 Claims, 4 Drawing Sheets

DISPLAY APPARATUS

BACKGROUND

1. Field

The present disclosure relates to a display apparatus.

2. Description of the Related Art

When a video or a game is reproduced on a display apparatus, a higher refresh rate is used to express a smooth movement. Since the higher refresh rate leads to higher power consumption, power saving is intended by using a lower refresh rate when a still image is reproduced.

Reference is made to Japanese Unexamined Patent Application Publication No. 2013-156326 for the related art.

When the refresh rate is switched, a liquid-crystal panel also varies in luminance. The luminance variation causes human to feel flickering, thus leading to degradation of display quality. It is thus desirable to provide a display apparatus that controls flickering occurring at the switching of refresh rate.

SUMMARY

According to an aspect of the disclosure, there is provided a display apparatus including a display panel that includes a liquid-crystal panel and a backlight arranged behind the liquid-crystal panel and a controller that controls a luminance of the backlight and a transmittance ratio of the liquid-crystal panel. The controller is configured to: when a refresh rate at which an image is displayed on the display panel in accordance with a video signal is switched, vary the luminance of the backlight such that a variation of a luminance of the display panel between before and after switching of the refresh rate falls within a predetermined range with respect to the video signal at the same grayscale; vary the transmittance ratio of the liquid-crystal panel such that the variation of the luminance of the display panel falls within the predetermined range within a time duration that lasts from the switching of the refresh rate until the luminance of the backlight reaches a target value; and restore the original transmittance ratio of the liquid-crystal panel after elapse of the time duration.

DESCRIPTION OF THE EMBODIMENTS

1. Description of Display Apparatus

Figure 1:
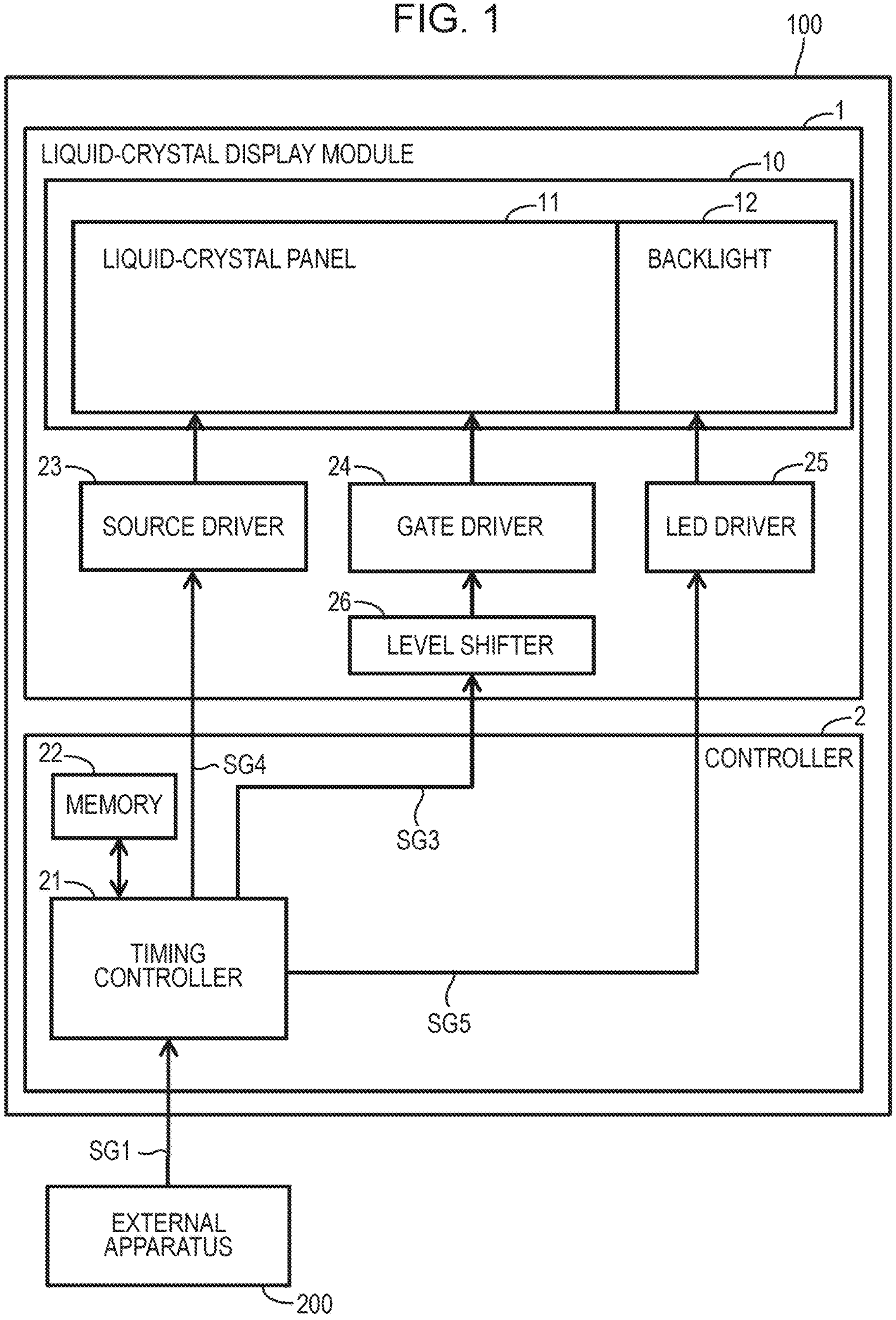
FIG. 1 schematically illustrates a display apparatus of a first embodiment.

According to a first aspect of the disclosure, a display apparatus includes a display panel that includes a liquid-crystal panel and a backlight arranged behind the liquid-crystal panel and a controller that controls a luminance of the backlight and a transmittance ratio of the liquid-crystal panel. The controller is configured to: when a refresh rate at which an image is displayed on the display panel in accordance with a video signal is switched, vary the luminance of the backlight such that a variation of a luminance of the display panel between before and after switching of the refresh rate falls within a predetermined range with respect to the video signal at the same grayscale; vary the transmittance ratio of the liquid-crystal panel such that the variation of the luminance of the display panel falls within the predetermined range within a time duration that lasts from the switching of the refresh rate until the luminance of the backlight reaches a target value; and restore the original transmittance ratio of the liquid-crystal panel after elapse of the time duration.

If the luminance of the backlight remains unchanged, the luminance of the display panel varies as the refresh rate increases or decreases. When the refresh rate is switched, the display apparatus of an embodiment increases or decreases the luminance of the backlight such that the variation of the luminance of the display panel between before and after the switching of the refresh rate falls within a predetermined range with respect to the video signal at the same grayscale. The "predetermined range" refers to a range of variation of the luminance within which flickering is invisible to human eye. The range of variation of the luminance as the predetermined range is equal to or lower than 1% of the luminance prior to the switching of the refresh rate. Preferably, the range of variation of the luminance as the predetermined range is equal to or lower than 0.6% of the luminance prior to the switching of the refresh rate. More preferably, the range of variation of the luminance as the predetermined range is zero. The variation of the luminance of the backlight thus cancels out the variation of the luminance of the display panel responsive to the switching of the refresh rate. The display apparatus of the first aspect increases or decreases the transmittance ratio of liquid-crystal panel such that the variation of the luminance of the display panel falls within the predetermined range within the time duration that lasts from the switching of the refresh rate until the luminance of the backlight reaches the target value. Even when a time lag occurs in the variation of the luminance of the backlight and the variation of the luminance of the display panel occurs in response to the switching of the refresh rate during the time lag, the variation of the luminance of the display panel is canceled out by the variation of the transmittance ratio of the liquid-crystal panel. The variation of the luminance of the display apparatus may thus be controlled at the switching of the refresh rate and during the time lag of the variation of the luminance of the backlight subsequent to the switching of the refresh rate. The flickering caused at the switching of the refresh rate may be controlled.

In the display apparatus according to the second aspect of the disclosure in view of the first aspect, the liquid-crystal panel may include a thin-film transistor substrate including a gate line, a source line and a pixel electrode, and varying the transmittance ratio of the liquid-crystal panel may include varying a length of an on-period of a gate voltage applied to the gate line. The transmittance ratio of the liquid-crystal panel may thus be varied.

In the display apparatus according to the third aspect of the disclosure in view of one of the first and second aspects, varying the transmittance ratio of the liquid-crystal panel may include varying a gamma value of the liquid-crystal panel. The transmittance ratio of the liquid-crystal panel may thus be varied.

2. Example of Display Apparatus

First Embodiment

FIG. 1 schematically illustrates a display apparatus 100 of the first embodiment of the disclosure. The display apparatus 100 includes a liquid-crystal display module 1 and a controller 2 controlling the liquid-crystal display module 1. The liquid-crystal display module 1 includes a display panel 10, drivers 23 through 25 used to display an image on the display panel 10, and a level shifter 26. The display panel 10 includes a liquid-crystal panel 11, and a backlight 12 arranged behind the liquid-crystal panel 11. The backlight 12 controls a displaying operation of the display panel 10 and a transmittance ratio of the liquid-crystal panel 11.

The liquid-crystal panel 11 includes, for example, a thin-film transistor (TFT) substrate as a glass substrate, a color filter substrate, and a liquid-crystal layer interposed between the TFT substrate and the color filter substrate. The TFT substrate includes multiple gate lines (scanning lines) and multiple source lines (signal lines) perpendicularly intersecting the gate lines, TFTs respectively arranged close to intersections, and pixel electrodes respectively connected to the TFTs (these elements are not illustrated).

The backlight 12 is arranged behind the liquid-crystal panel 11 and emits light toward the liquid-crystal panel 11. The backlight 12 includes multiple light emitting diodes (LEDs). The LED driver 25 serves as a control part of the backlight 12.

The controller 2 includes a timing controller 21 and a memory 22. For example, the timing controller 21 is an integrated circuit.

The display apparatus 100 receives a video signal SG1 from an external apparatus 200. The video signal SG1 is input to the timing controller 21. The timing controller 21 generates a vertical synchronization signal and a horizontal synchronization signal in response to the video signal SG1.

The timing controller 21 supplies a signal SG3 to the gate driver 24 via the level shifter 26. The signal SG3 is a control signal that is synchronized with the vertical synchronization signal and the horizontal synchronization signal. The signal SG3 is the control signal that specifies a voltage (gate-on voltage) supplied as a gate signal to the gate line of the gate driver 24 and timing when the gate-on signal is applied. The signal SG3 is thus a gate drive timing signal. The gate-on voltage turns on the gate of the TFTs of the liquid-crystal panel 11. The gate driver 24 applies the gate signal to the gate line in response to the signal SG3.

The timing controller 21 supplies the source driver 23 with a signal SG4 that is a control signal that is synchronized with the vertical synchronization signal and the horizontal synchronization signal. The signal SG4 is the control signal that specifies a voltage (source voltage) supplied as a source signal to a source line of the source driver 23 and timing when the source voltage is applied. The source driver 23 applies the source signal to the source line in response to the signal SG4. In this way, data is written on each pixel in accordance with the video signal SG1.

The timing controller 21 analyzes the control signal received together with the video signal SG1 and thus determines the refresh rate (drive frequency) used to display an image on the display panel 10 in accordance with the video signal SG1. The determined refresh rate is stored on the memory 22. In this way, the refresh rate most recently determined refresh rate is stored on the memory 22.

The timing controller 21 changes the frequency of the vertical synchronization signal in accordance with the determined refresh rate. As an example, the timing controller 21 fixes an operating frequency (operating clock) to a specific frequency in accordance with the refresh rate and varies a blanking period. In this case, the timing controller 21 sets the blanking period to be shorter as the refresh rate is higher and sets the blanking period to be longer as the refresh rate is lower. During the blanking period, there are cases when charges applied to a liquid-crystal layer of the liquid-crystal panel 11 pass through to a member surrounding the liquid-crystal layer and the alignment state of liquid-crystal molecules gradually changes. The charges are more easily to pass through as the blanking period is longer. For this reason, the luminance of the display panel 10 is more likely to fall as the blanking period is longer. Given that the luminance of the backlight 12 is fixed and an image to be displayed is on the same grayscale, the luminance of the display panel 10 falls as the refresh rate is lower and rises as the refresh rate is higher.

If the determined refresh rate is different from the refresh rate stored on the memory 22, the timing controller 21 detects switching of the refresh rate. The timing controller 21, when having detected the switching of the refresh rate, outputs a signal SG5 to the LED driver 25. The signal SG5 is a control signal that instructs the LED driver 25 to modify the current to be output to the backlight 12. In response to the signal SG5, the LED driver 25 modifies the current to be output to the backlight 12. The luminance of the backlight 12 varies when the refresh rate is switched.

The timing controller 21 determines, in response to a difference of the refresh rate, an amount of modification of the current that is output from the LED driver 25 to the backlight 12. For example, the timing controller 21 stores an arithmetic expression used to calculate the amount of modification in accordance with the difference of the refresh rate and thus calculates the amount of modification by substituting the difference of the refresh rate into the arithmetic expression. As another example, a modification table (not illustrated) that defines the correspondence between a difference of the refresh rate and a correction value may be stored on the memory 22.

The difference of the refresh rate and the amount of modification defined by the arithmetic expression signifies that the luminance of the backlight 12 is varied such that the variation of the luminance of the display panel 10 between before and after the switching of the refresh rate with respect to the video signal SG1 of the same grayscale falls within a predetermined range. The "predetermined range" signifies a range of the variation of the luminance of the backlight 12 within which flickering is invisible to human eye. Preferable the variation of the luminance is zero.

If the refresh rate rises, the luminance of the display panel 10 increases with the luminance of the backlight 12 remaining unchanged and the luminance of the backlight 12 falls because of the relationship between the difference of the refresh rate and the amount of the modification.

Specifically, the amount of the modification with the refresh rate rising signifies that the current is reduced such that the luminance of the backlight 12 is reduced to a target value. If the refresh rate falls, the luminance of the display panel 10 is reduced with the luminance of the backlight 12 remaining unchanged and the relationship between the difference of the refresh rate and the amount of the modification signifies that the luminance of the backlight 12 is increased. Specifically, the amount of the modification with the refresh rate falling signifies that the current value is increased such that the luminance of the backlight 12 is increased to a target value. The absolute value of the amount of the modification is higher as the difference of the refresh rate is larger and is lower as the difference of the refresh rate is smaller.

Upon detecting the switching of the refresh rate, the timing controller 21 varies the signal SG3 applied to the level shifter 26. In response to the signal SG3, the level shifter 26 changes the length of a period (on period of the gate signal) throughout which the gate signal is at a gate-on voltage.

If the-on period of the gate signal is changed, charging time of a pixel electrode varies. If the charging time is longer, liquid-crystal modules in a pixel electrode portion sufficiently rotate, causing a transmittance ratio to increase. Conversely, if the charging time is shorter, rotation of liquid-crystal modules is not sufficient and transmittance ratio fails to rise high enough. Specifically, given that the luminance of the backlight 12 is fixed and the signal on the same grayscale is displayed, if the on period of the gate signal (specifically, the charging time) is set to be longer, the transmittance ratio of the liquid-crystal panel 11 rises, increasing the luminance of the display panel 10. If the one period is set to be shorter, the transmittance ratio of the liquid-crystal panel 11 falls, decreasing the luminance of the display panel 10.

The timing controller 21 determines an amount of change in the length of the on period of the gate signal in accordance with the difference of the refresh rate. For example, the timing controller 21 stores an arithmetic expression used to calculate the amount of change in the length of the on period of the gate signal from the difference of the refresh rate and calculates the amount of change by substituting the difference of the refresh rate into the arithmetic expression.

When the LED driver 25 modifies, with the refresh rate switched, the current that the LED driver 25 outputs to the backlight 12 in response to the signal SG5, the amount of change in the length of the on period of the gate signal is used to vary the transmittance ratio of the liquid-crystal panel 11 such that the variation of the luminance of the display panel 10 within a predetermined period of time from the modification of the current falls within the predetermined range. The "predetermined range" of the variation of the luminance of the display panel 10 is identical to the predetermined range described above. The predetermined period is a period of change ΔT that lasts until the luminance of the backlight 12 reaches a target value under the control of the LED driver 25 in response to the signal SG5.

More specifically, if the refresh rate rises, the charging time is shortened to decrease the transmittance ratio of the liquid-crystal panel 11 and if the refresh rate falls, the charging time is prolonged to increase the transmittance ratio of the liquid-crystal panel 11. The absolute value of the amount of change of the charging time obtained through the arithmetic expression is larger in absolute value as the difference of the refresh rate is higher and smaller in absolute value as the difference of the refresh rate is lower.

Figure 2:
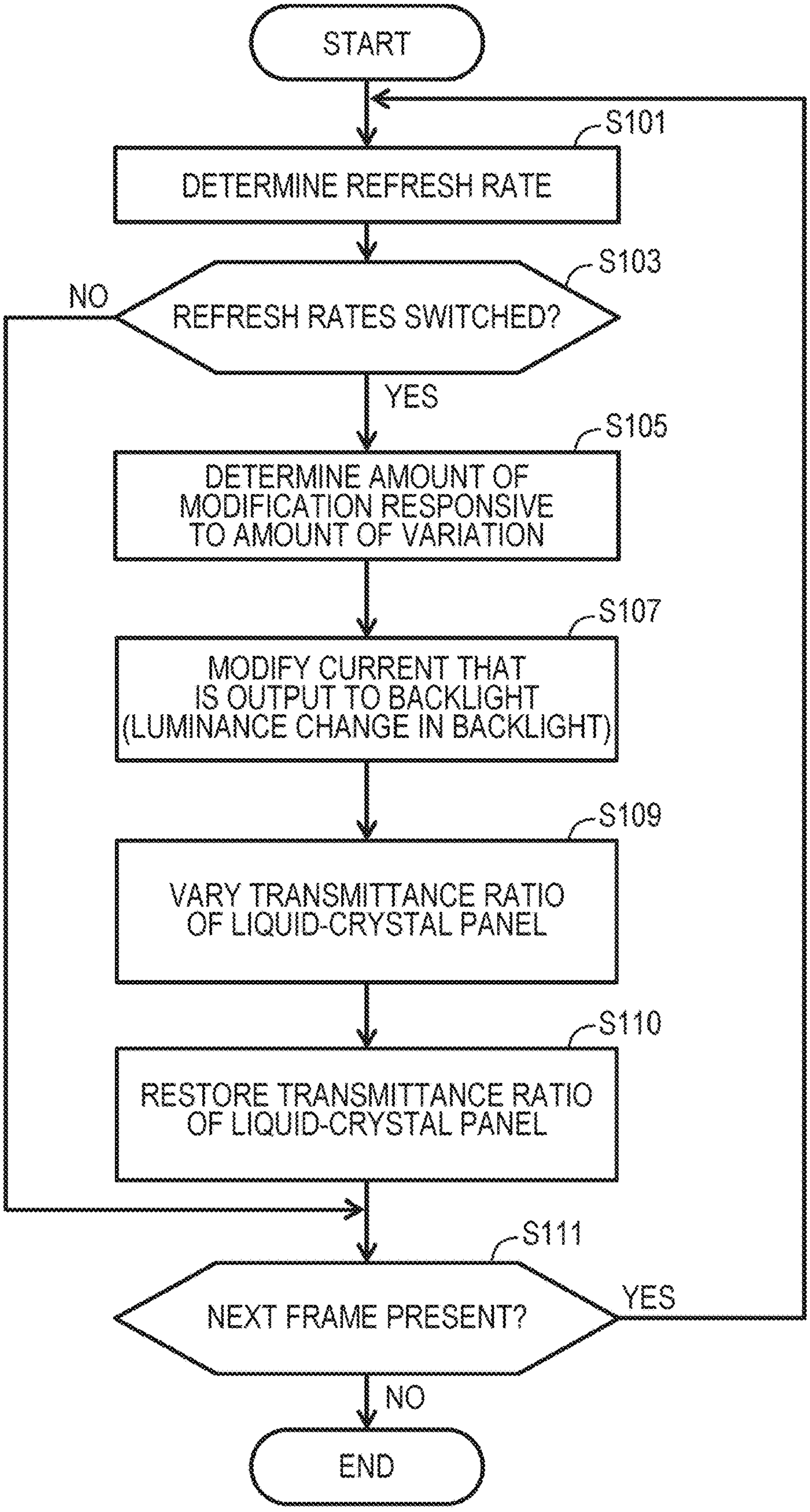
FIG. 2 is a flowchart illustrating an example of a control method of the display apparatus of the first embodiment.

FIG. 2 is a flowchart illustrating an example of the control method of the display apparatus 100 of the first embodiment. In response to the reception of the video signal SG1 from the external apparatus 200, the timing controller 21 determines the refresh rate using the control signal received together with the video signal SG1 (step S101). The timing controller 21 determines the refresh rate every predetermined timing. For example, although the timing controller 21 determines the refresh rate every frame, the determination timing of the refresh rate is not limited to every frame. If the refresh rate determined in step S101 is different from the refresh rate stored on the memory 22, the timing controller 21 detects a change (switching) of the refresh rate (step S103). If the switching of the refresh rate is detected (yes path in step S103), the timing controller 21 determines the amount of modification of the current output by the LED driver 25 to the backlight 12 and the amount of change of the length of the gate-on period (step S105). This determination is performed based on a difference between the refresh rate stored on the memory 22 and the refresh rate determined in step S101.

As an example, in step S105, the timing controller 21 determines the amount of modification in the current output to the backlight 12 by substituting a difference of the refresh rate into the stored arithmetic expression. Also in step S105, the timing controller 21 determines the amount of change in the length of the gate-on period by similarly substituting the difference of the refresh rate into the arithmetic expression.

The timing controller 21 transmits the signal SG5 to the LED driver 25 and thus instructs the LED driver 25 to modify the current to be output to the backlight 12 (step S107). In this way, the luminance of the backlight 12 varies in response to the signal SG5.

At the same time as in step S107, the timing controller 21 modifies the signal SG3 to be output to the level shifter 26 in accordance with the amount of change determined in step S105 (step S109). In this way, the length of the gate-on period varies in response to the modified signal SG3 and the transmittance ratio of the liquid-crystal panel 11 varies in response to the length of the gate-on period.

After the period of change ΔT from the transmission of the signal SG5 to the LED driver 25, the timing controller 21 restores the original signal SG3 to be output to the level shifter 26 (step S110). During the period of change ΔT until the luminance of the backlight 12 reaches the target value, the transmittance ratio of the liquid-crystal panel 11 varies such that the luminance of the display panel 10 falls within the predetermined range and after the elapse of the period of change ΔT, the original transmittance ratio of the liquid-crystal panel 11 is restored.

If the video signal SG1 has a next frame (yes path in step S111), the process starts over again with step S101. Through these steps, the process is complete (no path in step S111).

Figure 3:
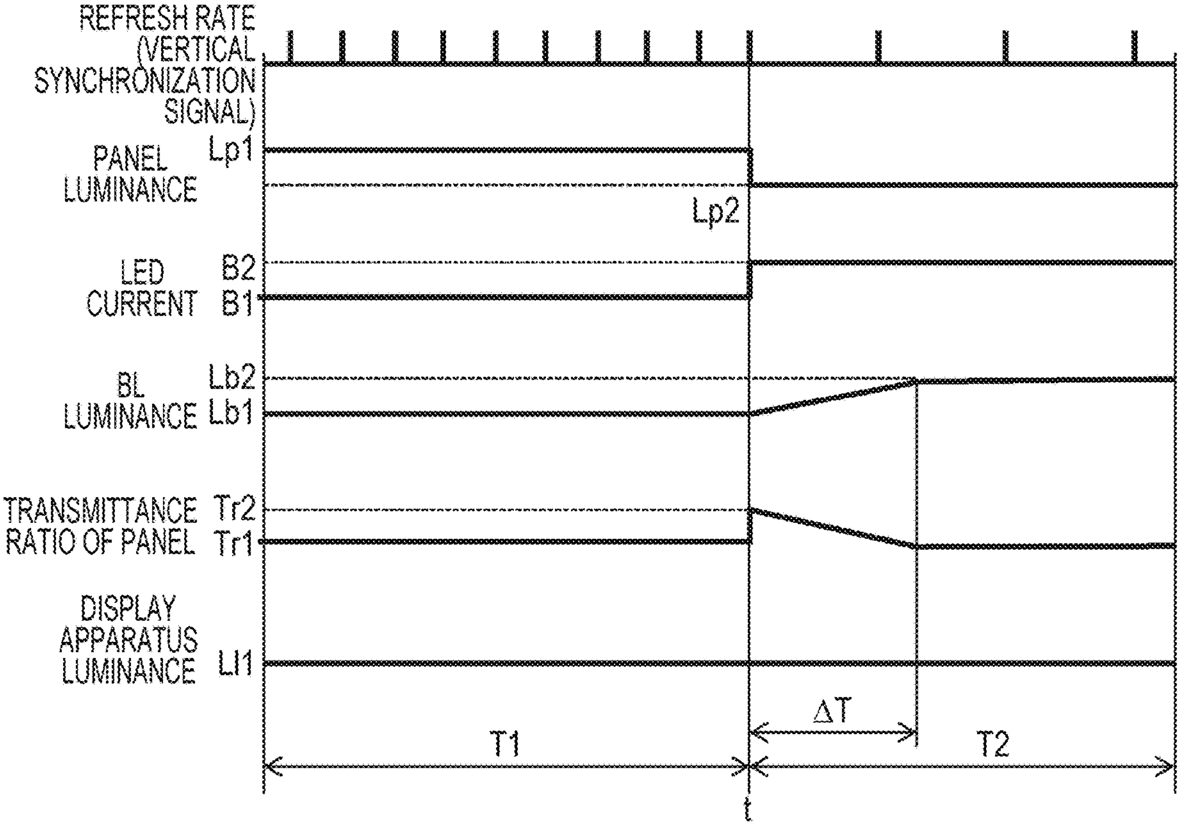
FIG. 3 illustrates a variation of the luminance of the display apparatus that is controlled by the control method of the first embodiment.
Figure 4:
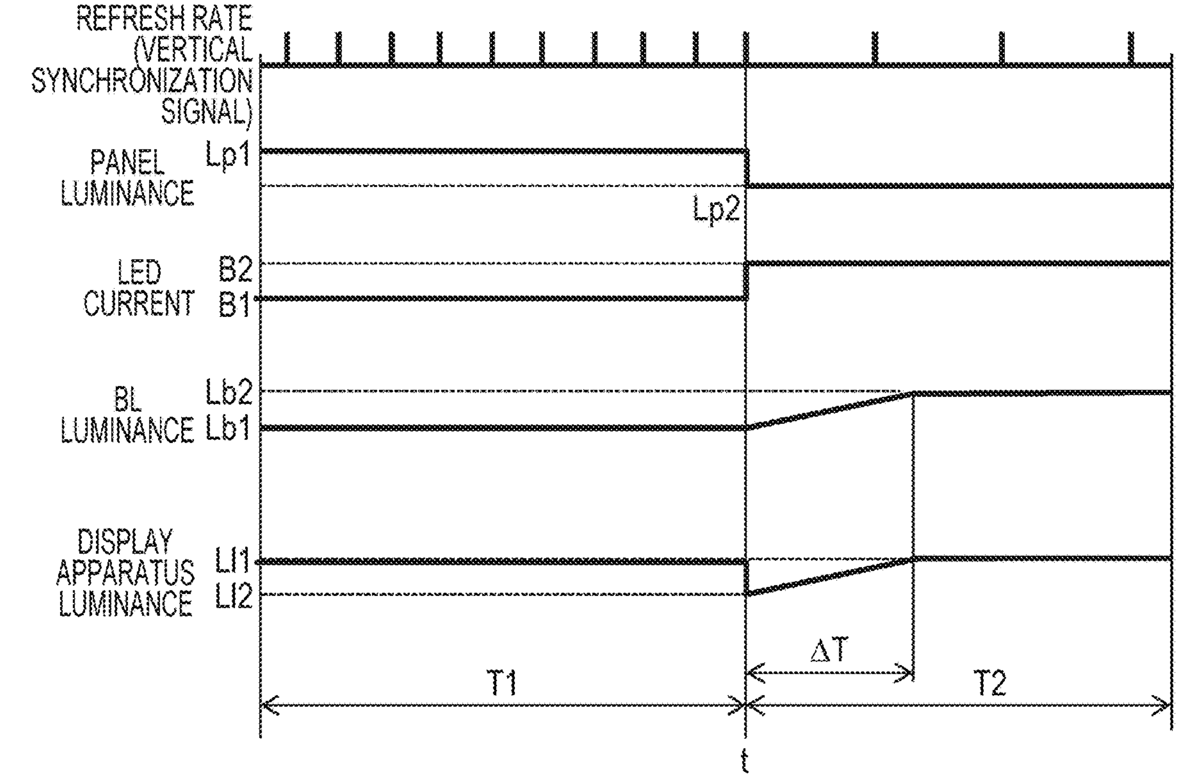
FIG. 4 illustrates a variation of the luminance of the display apparatus controlled by a control method of a comparative example.

FIG. 3 illustrates a variation of the luminance of the display apparatus 100 of the first embodiment. FIG. 4 illustrates a variation of the luminance of a display apparatus as a comparative example. The display apparatus as the comparative example varies the luminance of a backlight while not varying the transmittance ratio of a liquid-crystal panel.

Referring to FIGS. 3 and 4, the liquid-crystal panel 11 is driven at a high refresh rate (for example, 120 Hz) for a period T1 and is driven at a low refresh rate (for example, 30 Hz) for a period T2. In FIGS. 3 and 4, pulses appearing at a row identified by refresh rate are the vertical synchronization signal (Vsync). The horizontal direction in FIGS. 3 and 4 represents time and the high refresh rate is switched to the low refresh rate at timing t.

With the high refresh rate switched to the low refresh rate at timing t, the luminance of the display panel 10 falls from luminance Lp1 down to Lp2 on the assumption that the luminance of the backlight 12 remains unchanged (Lp1>Lp2). In the control method of the embodiment and the control method of the comparative example, upon detecting the switching from the high refresh rate to the low refresh rate at timing t, the timing controller 21 outputs the signal SG5 to the LED driver 25, thereby increasing the current (LED current) output to the backlight 12 from a current value B1 to a current value B2 (B1<B2). In this way, the luminance of the backlight 12 rises from luminance Lb1 to luminance Lb2 serving as a target value (Lb1<Lb2).

Even when the LED current is increased from the current value B1 to the current value B2, the luminance of the backlight 12 does not immediately reach the luminance Lb2. Specifically, when the output current is increased from the current value B1 to the current value B2, there occurs a time lag of the period of change $\Delta T$ before the luminance Lb2 as the target value is reached. In the control method as the comparative example (FIG. 4), the luminance of the display apparatus 100 (luminance of display apparatus) immediately falls from luminance LI1 to luminance LI2 at timing t (LI1>LI2), and then gradually returns to luminance LI1 for the period of change $\Delta T$ as the luminance of the backlight 12 increases. As a result, in the control method (FIG. 4) as the comparative example, luminance variation occurs for the period of change $\Delta T$. If the period of change $\Delta T$ is longer, flickering may occur to the eyes of the user.

In the control method (FIG. 3) of the first embodiment, the timing controller 21 modifies at timing t the signal SG3 to be output to the level shifter 26 and thus changes the length of the gate-on period to prolong the charging time of the pixel electrode. In this way, the transmittance ratio of the liquid-crystal panel 11 increases from transmittance ratio Tr1 as a normal value to transmittance value Tr2 higher than the transmittance ratio Tr1 (Tr1<Tr2) at timing t.

Referring to FIG. 3, the timing controller 21 adjusts the length of the gate-on period such that the transmittance ratio of the liquid-crystal panel 11 gradually varies from the transmittance ratio Tr2 to the transmittance ratio Tr1 for the period of change $\Delta T$. The delay of an increase of the luminance of the backlight 12 (from Lb1 to Lb2) for the period of change $\Delta T$ is canceled out by the variation of the transmittance ratio of the liquid-crystal panel 11. As a result, the luminance of the display apparatus 100 is maintained within a predetermined range (to almost constant luminance LI1 in FIG. 3) before and after the switching of the refresh rate at timing t as illustrated at the bottom row of FIG. 3.

In the control method of the embodiment (FIG. 3), the length of the gate-on period is restored to the original length thereof in response to the signal SG3 after the elapse of the period of change $\Delta T$ from timing t. The transmittance ratio of the liquid-crystal panel 11 is thus restored to the transmittance ratio Tr1 from the transmittance ratio Tr2 after timing t.

In the control method of the embodiment (FIG. 3) as described above, the transmittance ratio of the liquid-crystal panel 11 is varied by changing the length of the gate-on period for the period of change $\Delta T$ from timing t. The length of the gate-on period is set to compensate for a gradual variation of the luminance of the backlight 12 for the period of change $\Delta T$. For the period of change $\Delta T$ serving as a time lag that lasts until the luminance of the backlight 12 reaches the luminance Lb2, the variation of the luminance of the display panel 10 (from Lp1 to Lp2 as illustrated in FIG. 3) caused by the switching of the refresh rate at timing t is canceled out by a combination the variation of the luminance of the backlight 12 and the variation of the transmittance ratio of the liquid-crystal panel 11. In this way, the luminance of the display apparatus 100 is maintained at luminance LI1 even when the refresh rate is switched.

Since the luminance of the backlight 12 transitions to the luminance Lb2 after the period of change $\Delta T$, a luminance reduction (the transition from Lp1 to Lp2 illustrated in FIG. 3) caused by a decreased refresh rate is canceled out by the luminance of the backlight 12. When the transmittance ratio of the liquid-crystal panel 11 returns to the standard transmittance ratio Tr1, the luminance of the display apparatus 100 is maintained at luminance LI1. In this way, flickering caused at the switching of the refresh rate may be controlled.

Second Embodiment

Changing the length of the gate-on voltage is a control example used to vary the transmittance ratio of the liquid-crystal panel 11. Another method may be used to vary the transmittance ratio of the liquid-crystal panel 11. For example, the timing controller 21 may modify the signal SG4 such that a source voltage is transitioned at the switching of the refresh rate. Specifically, the gamma value of the liquid-crystal panel 11 is modified to compensate for the time lag when the luminance of the backlight 12 is varied at the switching of the refresh rate. The source driver 23 modifies, in response to the modified gamma value, the value of the source voltage at each grayscale to be displayed. In this way, the source voltage modified in response to the modification of the gamma value may vary the transmittance ratio of the liquid-crystal panel 11.

In the second embodiment, the timing controller 21 determines the amount of change of the gamma value from the difference of the refresh rate. For example, the timing controller 21 pre-stores an arithmetic expression used to calculate the amount of change of the gamma value from the difference of the refresh rate and thus calculates the amount of change of the gamma value by substituting the difference of the refresh rate into the arithmetic expression.

The LED driver 25 modifies the current output to the backlight 12 in response to the signal SG5 with the refresh rate switched. In this case, the difference of the refresh rates and the amount of change of the gamma value, defined by the arithmetic expression, are used to vary the transmittance ratio of the liquid-crystal panel 11 such that the variation of the luminance of the display panel 10 within a predetermined period of time from the modification of the current falls within a predetermined range. Specifically, the amount of change of the gamma value obtained through the arithmetic expression is set to increase the transmittance ratio of the liquid-crystal panel 11 with the refresh rate increased and set to decrease the transmittance ratio of the liquid-crystal panel 11 with the refresh rate decreased.

In the second embodiment, the timing controller 21 modifies the signal SG4 to change the gamma value with the determined amount of change and then outputs the modified signal SG4 to the source driver 23. The timing controller 21 thereafter restores the signal SG4 to return to the original gamma value and then outputs the restored signal SG4 to the source driver 23. In this way, the transmittance ratio of the liquid-crystal panel 11 varies in response to the difference of the refresh rate and then returns to the original transmittance ratio.

Figure 5:
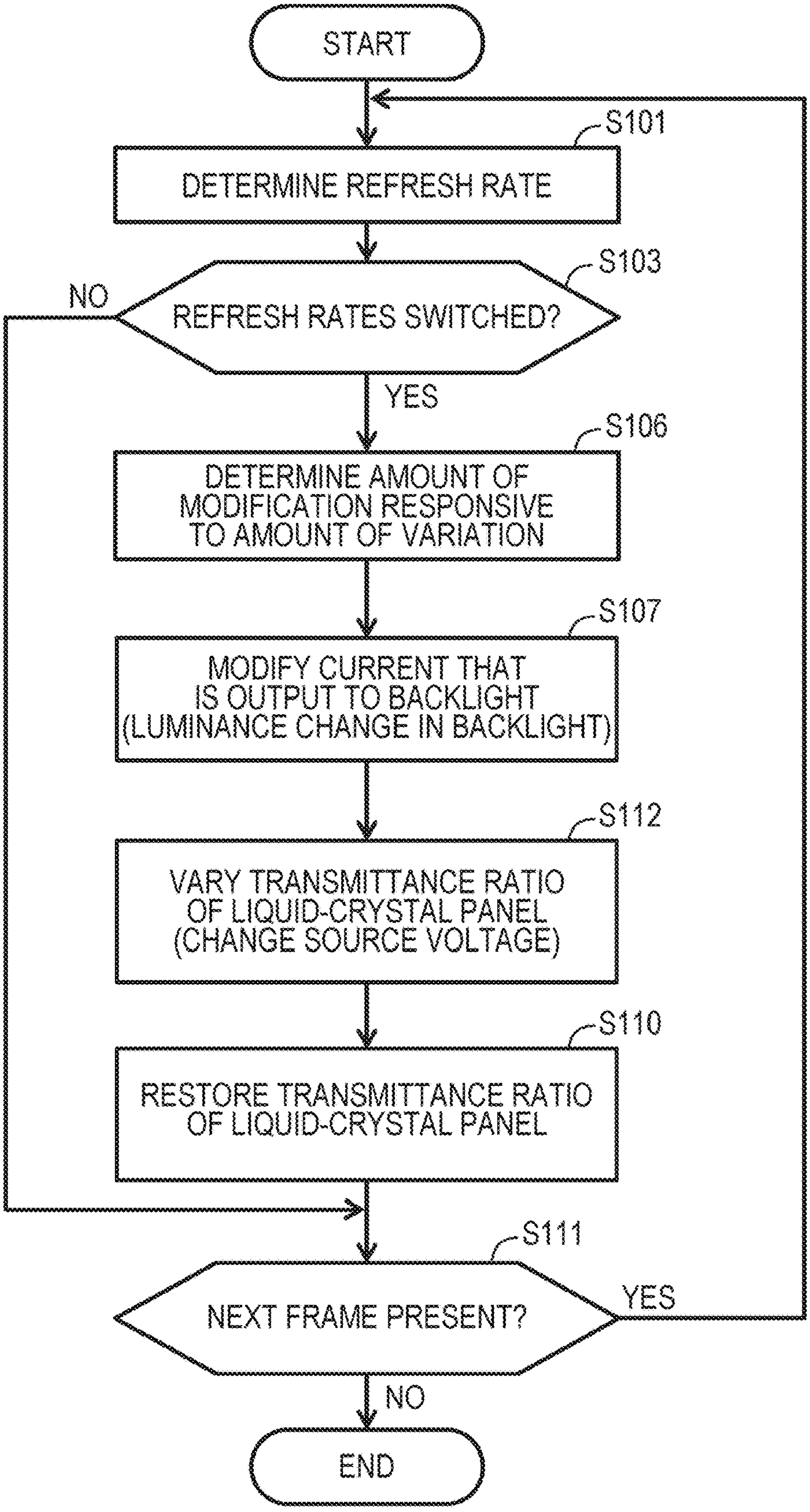
FIG. 5 is a flowchart illustrating an example of the control method of a display apparatus of a second embodiment.

FIG. 5 is a flowchart illustrating an example of the control method of the display apparatus 100 of the second embodiment. In contrast to the control method of the first embodiment (FIG. 2), the control method of the second embodiment includes step S106 in place of step S105 and step S112 in place of step S109.

In the control method of the second embodiment, if described in detail, the timing controller 21 determines the amount of change of the gamma value in step S106 in place of the operation determining the amount of change of gate timing (step S105). In step S112, the timing controller 21 transmits the signal SG4 to the source driver 23 at the same time as step S107 and thus instructs the source driver 23 to apply a source voltage responsive to the modified gamma value. The source voltage responsive to the display grayscale varies in response to the signal SG4 and the transmittance ratio of the liquid-crystal panel 11 varies in response to the variation of the source voltage.

As in the control method of the first embodiment (FIG. 3), the display apparatus 100 controlled by the control method of the second embodiment controls the variation of the luminance of the display panel 10 to within the predetermined range between before and after the switching of the refresh rate.

In the second embodiment, varying the source voltage in response to the change of the gamma value causes the transmittance ratio of the liquid-crystal panel 11 to vary. The change of the gamma value may not very much affect the top level of the grayscale or a level near the top level and may contribute to the variation of the transmittance ratio of the liquid-crystal panel 11 when an image is displayed at an intermediate level of the grayscale. In the characteristics of human eye, the luminance variation at the top level of the grayscale or at the level near the top level is difficult to visibly recognize but the luminance variation at the intermediate level of the grayscale may be easy to visibly recognize. If the transmittance ratio at the intermediate level of the grayscale of the liquid-crystal panel 11 is varied by changing the gamma value, the time lag of the luminance variation of the backlight 12 may be effectively controlled and flickering visible to human eye at the switching of the refresh rate may be restricted.

Control to vary the transmittance ratio of the liquid-crystal panel 11 may be a combination of the change of the gate-on period and the change of the gamma value. In other words, the first embodiment and second embodiment may be combined.

Third Embodiment

Concerning the first and second embodiments, the control at the switching of the refresh rate from high to low rate is specifically described. The same control may be used when the refresh rate is switched from low to high rate. In such a case, given constant luminance of the backlight 12, the luminance of the display panel 10 increases when the refresh rate is switched. In this control method, the transmittance ratio of the liquid-crystal panel 11 varies in a direction opposite to the direction in the first and second embodiments. In the similar way as described with reference to FIG. 3, the luminance of the display apparatus 100 is maintained at luminance LI1 even when the refresh rate is switched.

MODIFICATIONS

The control of the luminance of the backlight 12 at the switching of the refresh rate is not limited to the modification of the current output to the backlight 12. The luminance of the backlight 12 may be controlled by adjusting a duty factor of the LED current with the refresh rate switched.

The present disclosure contains subject matter related to that disclosed in Japanese Priority Patent Application JP 2023-177208 filed in the Japan Patent Office on Oct. 13, 2023, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus comprising:

a display panel that includes a liquid-crystal panel and a backlight arranged behind the liquid-crystal panel; and a controller that controls a luminance of the backlight and a transmittance ratio of the liquid-crystal panel, wherein the controller is configured to:

when a refresh rate at which an image is displayed on the display panel in accordance with a video signal is switched, vary the luminance of the backlight such that a variation of a luminance of the display panel between before and after switching of the refresh rate falls within a predetermined range with respect to the video signal at a same grayscale;

vary the transmittance ratio of the liquid-crystal panel such that the variation of the luminance of the display panel falls within the predetermined range within a time duration that lasts from the switching of the refresh rate until the luminance of the backlight reaches a target value; and restore the original transmittance ratio of the liquid-crystal panel after elapse of the time duration.

2. The display apparatus according to claim 1, wherein the liquid-crystal panel includes a thin-film transistor substrate including a gate line, a source line and a pixel electrode, and wherein varying the transmittance ratio of the liquid-crystal panel includes varying a length of an on-period of a gate voltage applied to the gate line.

3. The display apparatus according to claim 1, wherein varying the transmittance ratio of the liquid-crystal panel includes varying a gamma value of the liquid-crystal panel.

* * * * *